United States Statutory Invention Registration [19]

[11] Reg. Number: H624

Handlin, Jr. et al. [43] Published: Apr. 4, 1989

[54] POLYBUTYLENE GEL FILLED CABLES

[75] Inventors: Dale L. Handlin, Jr.; Robert G. Lutz; William H. Korcz, all of Houston, Tex.

[73] Assignee: Shell Oil Compay, Houston, Tex.

[21] Appl. No.: 17,120

[22] Filed: Feb. 20, 1987

Related U.S. Application Data

[62] Division of Ser. No. 679,169, Dec. 6, 1984.

[51] Int. Cl.[4] ..... B32B 27/00

[52] U.S. Cl. ..... 428/462; 174/23 C; 174/23 R; 428/383

[58] Field of Search ..... 428/379, 383; 174/23 C, 174/23 R

[56] References Cited

U.S. PATENT DOCUMENTS

| | | | |
|---|---|---|---|
| 3,607,487 | 2/1968 | Biskeborn et al. | 156/47 |
| 3,684,760 | 8/1972 | Goldbach et al. | 524/579 |
| 3,717,716 | 2/1973 | Biskeborn et al. | 174/25 R |
| 3,775,548 | 11/1973 | Zinser, Jr. et al. | 174/23 C |
| 3,879,575 | 4/1975 | Dobbin et al. | 174/92 |
| 3,893,962 | 7/1975 | Walton et al. | 523/173 |
| 3,915,914 | 10/1975 | Binder et al. | 524/579 |
| 4,140,570 | 2/1980 | Kaufman | 523/173 |
| 4,259,540 | 3/1981 | Sabia | 174/23 C |
| 4,324,453 | 4/1982 | Patel | 174/23 C |
| 4,351,913 | 9/1982 | Patel | 523/173 |
| 4,361,507 | 11/1982 | Bourland | 523/173 |
| 4,361,508 | 11/1982 | Bourland | 523/173 |
| 4,509,821 | 4/1985 | Stenger | 523/173 |
| 4,617,422 | 10/1986 | Hagger | 174/23 C |

FOREIGN PATENT DOCUMENTS

| | | | |
|---|---|---|---|
| 121617 | 6/1944 | Australia . | |
| 135943 | 4/1947 | Australia . | |
| 0166832 | 1/1953 | Australia | 523/173 |
| 548825 | 8/1982 | Australia . | |
| 1465676 | 4/1971 | Fed. Rep. of Germany | 523/173 |
| 2320254 | 6/1974 | Fed. Rep. of Germany | 523/173 |
| 2092176 | 7/1982 | United Kingdom | 523/173 |

*Primary Examiner*—John F. Terapane
*Assistant Examiner*—Susan Wolffe

[57] ABSTRACT

A slow forming, thermally reversible gel for filling cables at or below the polybutylene use temperature, which comprises a butene-1 polymer or copolymer which may contain either or both ethylene comonomer and a styrene-ethylene-butylene-styrene block copolymer, and the rest naphthenic or paraffinic oil with an oil aromatic content up to 25% by weight.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG.1 TEMPERATURE FILLING RANGES AND USE TEMPERATURES FOR POLYBUTENE-1, WAXES, KRATON®G RUBBER, etc
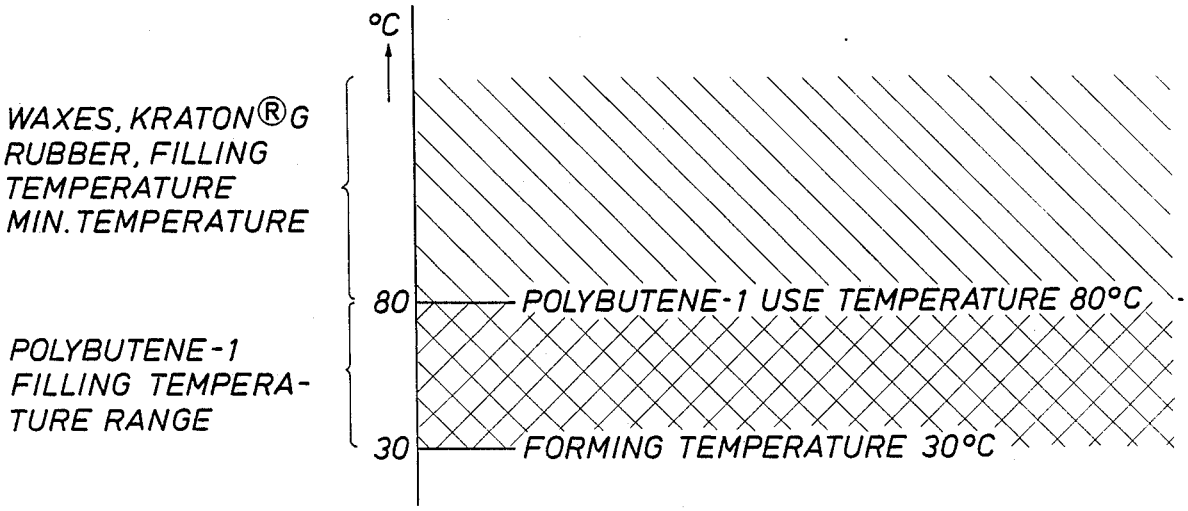

POLYBUTYLENE GEL FILLED CABLES

This is a division of application Ser. No. 679,169, filed Dec. 6, 1984.

BACKGROUND OF THE INVENTION

Cables for power, electronic (telephone) transmission, hydrophone cables for oil exploration at sea and other various uses have been filled with various substances in order to protect against water intrusion since 1970. Intrusion occurs when water penetrates into a localized opening in a cable sheath and is free to channel as far as physical processes for water spread and transport allow, often hundreds of feet. Not only does this upset capacitance balance of the transmission cable line but it introduces more potential corrosion sites in proproportion to the length of wire that is wetted. The useful life of water-soaked wires is obviously shorter than that of dry wires.

The solution that has been widely adopted is to fill the voids in the cable with a water insoluble filling material that simply encapsulates the cable components to prevent water intrusion. However, although this physical function of the cable filling material is straightforward, the choice of the material is not. Among the many considerations that are important for materials used in this application are the hydrophobic nature of the material, low temperature properties, flow characteristics at elevated temperatures, the highest temperature at which the encapsulant may be used ("upper service temperature"), processing characteristics, handling characteristics, dielectric properties, toxicity and cost.

Materials that satisfy most of these criteria and which have been widely used are described in U.S. Pat. Nos. 3,607,487 and 3,717,716 issued Sept. 21, 1971 and Feb. 20, 1973 respectively. These materials are essentially a petroleum jelly, mixed with a polymer, usually polyethylene, to impart consistency and prevent flowing at warm temperatures below the upper service temperature.

Similar hydrophobic encapsulants have been proposed for filling splice closures. For example, U.S. Pat. No. 3,879,575 issued Apr. 22, 1975 describes a mixture of a low viscosity oil gelled by a styrene-isoprene-styrene copolymer, again with polyethylene added to impart consistency and reduce slump.

U.S. Pat. No. 4,259,540 discloses the use of a sytrene-ethylene butylene-styrene block copolymer, polyethylene, and a paraffinic or napthenic oil, where the oil has a maximum of 5% aromatic oils, in order to enable the cable encapsulant to meet the functional requirements of the cable and to provide good handling characteristics that the petroleum jelly material does not possess.

However, all of these above-described encapsulants during the filling process, must be heated to a temperature above the "upper service temperature" of the encapsulant. The upper service temperature of the material is the temperature above which the material cannot be used in the cable. Thus, filling of most materials requires a time consuming step in order to heat the encapsulant to a pumpable consistency for filling. There has been long felt need for an encapsulant which meets other filling material requirements but which could be processed into the cable well below the "upper service temperature" of the encapsulant. Previously used encapsulants required that it and the cable be heated to a temperature well above the melting point of the encapsulant (i.e., the upper service temperature) in order to significantly reduce the viscosity of the fluid to allow filling of the cable. This heating is energy intensive and may be damaging to some of the electrical components of the cables. It also precludes the use of desirable cable component materials that may be advantageous, but which cannot tolerate high filling temperatures of these encapsulants.

In addition, an encapsulant which is thermally reversible has long been sought. This means that the encapsulant may be removed and replaced during maintenance time and time again at a temperature below the temperature that would damage the cables. An encapsulant which is thermally reversible can be heated to a liquid and then cooled to a gel over and over again without damage to the nature of the filling material, or cable components. This is especially true in hydrophone cables that are generally not permanently installed but towed at sea where the utility of such invention is paramount.

SUMMARY OF THE INVENTION

This invention includes a slow forming, thermally reversible gel so that it may be heated to a liquid and cooled to a gel over and over again at a temperature below the temperature that will damage the cables so that the gel may be removed and replaced during maintenance. The gel is slow forming, as the viscosity of the clear liquid rises over a period of several hours to several days to form the gel. It is this length of time that one has to fill the cables before the gel material becomes too viscous to flow, or remove the gel during maintenance.

The gel is based on light hydrocarbon process oils and isotactic butene-1 polymers or butene-1 copolymers. The filling material or gel encapsulating compound comprises from about 2 percent by weight to about 8 percent by weight butene-1 polymer or copolymer, wherein said butene-1 polymer or copolymer contains from about 0 percent by weight to about 10 percent by weight of a $C_2$–$C_5$ comonomer and from about 0 percent by weight to about 10 percent by weight of a styrene-ethylene-butylene styrene block copolymer, and from about 82 percent by weight to about 98 percent by weight of a naphthenic or paraffinic oil with an aromatic content of up to 25 percent by weight. The encapsulating compound is preferably about 6 percent by weight butene-1 polymer or copolymer wherein the butene-1 polymer or copolymer contains preferably about 6 percent by weight comonomer, preferably about 5% by weight of the S-EB-S block copolymer, and preferably about 89 percent by weight of a naphthenic or paraffinic oil with an aromatic content of preferably about 15 percent by weight. The $C_2$–$C_5$ comonomer is preferably an ethylenic comonomer.

This invention also includes a cable or other conduit requiring water protection which contains the encapsulating compound described above.

BRIEF DESCRIPTION OF THE DRAWING

FIG. 1 is a graph which compares the polybutylene gel upper service temperature and the temperatures at which previously described encapsulants such as waxes, rubbers, etc. had to be filled, as well as the temperature at which the encapsulating gel compound of the present invention may be filled.

DETAILED DESCRIPTION OF THE INVENTION

The encapsulating compound or gel of the present invention has the following properties:

(1) Above the gel temperature the material is a clear, low viscosity fluid;

(2) after cooling to room temperature the viscosity rises over a period of several hours to several days to form a gel, rendering the material too viscous to flow.

(3) As the gel forms it becomes translucent.

(4) The gel is thermally reversible at a temperature below the temperature that will damage the cables so that the gel may be removed and replaced during maintenance.

(5) The melting temperature, forming temperature, and forming time of the gel can be controlled by the choice and concentration of the polybutylene polymeric component by copolymerization or homopolymer in the base polymer.

(6) The gel is hydrophobic and protects the cable from water leakage.

The gel is based on light hydrocarbon process oils and isotactic butene-1 polymer or butene-1 copolymers. Because of their compatibility with the oils and crystallinity, the isotactic butene-1 polymers or copolymers dissolve in the oils above the polymers' melting temperature. Once dissolved, these polymers exhibit *very slow* recrystallization and gel network formation from solution as the temperature is lowered allowing the material to remain fluid at temperatures much below the gel's melting temperature for a period of approximately 24 to 48 hours. Eventually, the polymeric polybutylene crystallites form and become connected in a network forming a translucent gel.

Applicants have found that the presence of ethylene comonomer decreases both the gel's melting temperature and a rate of crystallization.

EXAMPLE 1

An isotactic butene-1 homopolymer was dissolved in HVI 100 N oil at 120° C. so that the solution contained 6 percent isotactic butene-1 homopolymer. As the solution temperature was lowered the viscosity began to rise sharply at about 40° C. (taken as the minimum filling temperature) and continued to rise to form a firm gel within *one hour* of reaching room temperature. The gel formed had a melting point of about 80° C.

EXAMPLE 2

Six percent DP8010 isotactic butene-1 with 5.7 percent by weight ethylene comonomer was dissolved in HVI 100 N oil. The solution was cooled from 120° C., the temperature necessary for the dissolving, and the viscosity began to rise at about 30° C. The solution material formed into a viscous, usable gel within 24–48 hours after the intiation of the cooling process. The resulting gel had a melting point of 55°–60° C.

EXAMPLE 3

The ethylenic comonomer containing polybutene-1 gel of Example 2 is filled into a suitable cable within 24–48 hours after initial cooling from the solution. The cable is ready for use within approximately 12 hours after such filling.

It is apparent that the addition of a comonomer which may be a $C_2$–$C_5$ comonomer and in the range of 2 to 8 percent, but preferably about 6 percent ethylene comonomer, has a dramatic effect on the properties of the gel. In addition, it is thought that many hydrocarbon fluids above the molecular weight of 150 will be gelled by isotactic butene-1 homopolymers and copolymers. For example, HVI 100 N oil has been used which has a 16 percent aromatic content. Shellflex® 131, which may be obtained from Shell Oil Company, Houston, Tex. may also be used as a suitable oil which contains about 24 percent aromatic content as well as Sunpar® 120 LW available from Sun Oil Co. contains less than 5 percent aromatic content.

It is also noted that blends of polybutylene with microcrystalline waxes such as Shellmax 500, available from Shell Oil Company, Houston, Tex. produced a firmer, more opaque gel which forms somewhat more rapidly than that gel claimed by applicants.

In addition, the addition of from about 0 percent by weight to about 10 percent by weight of KRATON® G thermoplastic rubbers, available from Shell Oil Company, Houston, Tex. increases the strength and clarity of the gels, with a slight decrease in gel formation time.

In reference to FIG. 1, it may be seen that the encapsulating or gel of applicant's invention is filled at 55° to 60° C. —well below the polybutene-1 use temperature of 80° C. The firm gel forming temperature is at 30° C. and the filling range is thus a 50° C. range between 80° C. and 30° C. If a filling material of waxes or rubbers were used, such filling material would have to be filled, as indicated in FIG. 1, at a point *above* the 80° C. use temperature of the polybutene-1. This would necessitate, of course, a time consuming and cost inefficient additional heating step prior to filling, as well as a reheating every time it became necessary to refill the cable because of leaks or other problems. The use of such materials would also preclude the use of cable components sensitive to temperatures above 80° C.

Applicant's invention encompasses a gel material which is not only slow forming to allow plenty of time to fill the cable without an additional heating step, but is also thermally reversible so that if the cable is later punctured and the gel material must be released and/or refilled into the cable, it may be heated to solution and cooled to the filling temperature over and over again without any loss of the gel materials' desirable filling characteristics.

Various additional modifications and extensions of this invention such as to various types of cable or not even to cable at all, will become apparent to those skilled in the art. All such variations and deviations which basically rely on the teachings through which this invention has advanced the art are properly considered to be within the spirit and scope of this invention.

What is claimed is:

1. A cable which may be used for low temperature filling without sacrificing the use temperature, and which may be easily repaired, which comprises:

a cable body, which contains a slow forming, thermally reversible translucent encapsulating compound, wherein said encapsulating compound contains from about 2 percent by weight to about 8 percent by weight butene-1 polymer or copolymer, wherein said butene-1 polymer or copolymer contains from about 3 percent by weight to about 10 percent by weight of a $C_2$–$C_5$ comonomer, and from about 92 percent by weight to about 95 percent by weight of a naphthenic or paraffinic oil, wherein said oil has an aromatic content of from about 5 percent by weight to about 25 percent by weight.

2. The cable of claim 1, which contains from about 0% by weight to about 10% by weight of styrene-ethylene-butylene-styrene block copolymer.

3. The cable of claim 1, wherein said translucent encapsulating compound consists of from about 4 percent by weight to about 7 percent by weight butene-1 polymer or copolymer, and wherein said butene-1 polymer or copolymer contains from about 3 percent by weight to about 8 percent by weight of said $C_2$–$C_5$ comonomer, from about 4% by weight to about 6% by weight of a styrene-ethylene-butylene-styrene block copolymer, and from about 87 percent by weight to about 92 percent by weight of said naphthenic or paraffinic oil, wherein said oil has an aromatic content of from about 5 percent by weight to about 25 percent by weight.

4. The cable in claim 1, wherein said translucent encapsulating compound comprises preferably about 6 percent by weight butene-1 polymer or copolymer, and wherein said butene-1 polymer or copolymer contains preferably about 6 percent by weight of a $C_2$–$C_5$ comonomer, preferably about 5% by weight of said styrene-ethylene-butylene-styrene block copolymer, and preferably about 89 percent by weight of said naphthenic or paraffinic oil, where said oil has an aromatic content of about 15 percent by weight.

* * * * *